United States Patent [19]

Mohan et al.

[11] Patent Number: 4,912,317

[45] Date of Patent: Mar. 27, 1990

[54] PITCH MATCH DETECTING AND COUNTING SYSTEM WITH TILTED OPTICAL AXIS

[75] Inventors: William L. Mohan, Barrington Hills; Thomas E. Kleeman, W Dundee; Paul E. Ridl, Carpentersville, all of Ill.

[73] Assignee: Spartanics, Ltd., Rolling Meadows, Ill.

[21] Appl. No.: 243,590

[22] Filed: Sep. 12, 1988

Related U.S. Application Data

[62] Division of Ser. No. 62,508, Jun. 12, 1987, Pat. No. 4,771,443.

[51] Int. Cl.[4] .......................... G01V 9/04; H01J 40/14

[52] U.S. Cl. .................................... 250/222.2; 377/53

[58] Field of Search ............. 250/222.1, 222.2, 223 R, 250/224; 377/30, 53, 6, 8; 356/446; 235/98 C

[56] References Cited

U.S. PATENT DOCUMENTS

| | | | |
|---|---|---|---|
| 3,234,360 | 2/1966 | Schooley, Jr. | 377/53 |
| 3,581,067 | 5/1971 | Willits et al. | 377/53 |
| 3,692,985 | 9/1972 | Kalman | 377/53 |
| 3,790,759 | 2/1974 | Mohan et al. | 377/53 |
| 3,835,306 | 9/1974 | Bills et al. | 377/53 |
| 4,066,173 | 1/1978 | Adams et al. | 377/6 |
| 4,639,592 | 1/1987 | Heitmann | 250/223 R |
| 4,694,474 | 9/1987 | Dorman et al. | 377/30 |

FOREIGN PATENT DOCUMENTS

| | | | |
|---|---|---|---|
| 0272892 | 12/1986 | Japan | 377/6 |

*Primary Examiner*—David C. Nelms
*Assistant Examiner*—Michael Messinger
*Attorney, Agent, or Firm*—Jacque L. Meister

[57] ABSTRACT

An apparatus for automatically counting stacked sheet-like materials having sheet-to-sheet brightness gradients alternating between positive and negative while simultaneously eliminating problems encountered when the sheet edge reflectance characteristics have combined lambertian and specular reflective natures. Rectification of a pitch matched sensor array's data output combined with a selective disposition of the sensor and illumination optical components relative to the sheet edges to be counted based upon the maximum acceptance angle of the optical system yields the improved count data necessary to achieve accurate counting.

3 Claims, 11 Drawing Sheets

PITCH MATCH DETECTING AND COUNTING SYSTEM WITH TILTED OPTICAL AXIS

This is a divisional of co-pending application Ser. No. 062,508 filed on Jun. 12, 1987, now U.S. Pat. No. 4,771,443.

BACKGROUND OF THE INVENTION

This invention relates generally to article counting apparatus and more particularly to sensing and data processing apparatus for the counting of a plurality of substantially identical thickness objects tightly stacked adjacent to one another. More specifically, this invention relates to improvements with respect to the article counting apparatus disclosed by S.P. Willits, et al, in U.S. Pat. No. RE 27,869, William L. Mohan, et al, in U.S. Pat. No. 4,373,135, William L. Mohan, et al, in Pat. No. 4,542,470, and William L. Mohan, et al in U.S. Pat. No. 3,813,523, hereinafter the Willits, Mohan 1, Mohan 2 and Mohan 3 patents, respectively.

While the foregoing prior art devices generated satisfactory counting data for stacked objects in most instances they were particularly designed to define the very minute contrast areas between the adjacent stacked objects each of which has basically identical reflectivity associated with the edges of the several stacked objects. The Willits reference disclosed the concept of a pair of sensors "pitch-matched" to the object edge thickness to resolve the difficulty encountered with such material in generating a non-ambiguous signal where there is essentially no brightness gradient between the adjacent objects but there is an increasing brightness gradient from sheet-to-sheet. Willits describes the differential summing of the outputs of a pair of pitch matched sensors to provide an approximation of the first derivative of brightness across the elements comprising the stack. This system works well yielding unambiguous data provided the brightness slope generated by the summed sensor outputs continues in either a positive or negative direction or stays constant.

If, however, the brightness gradient alternates from positive to negative from sheet to sheet, the output wave train data reverts to a sub-harmonic of the desired output count frequency and, as a result, the output data becomes ambiguous. This condition arises when the objects are very tightly stacked and successive object edges appear alternately light and dark.

SUMMARY OF THE INVENTION

A principal object of the invention is to provide a new and improved stacked object detecting and counting system that overcomes the foregoing limitations of the prior art.

Still another object of the invention is to provide a new and improved stacked object detecting and counting system that provides means for overcoming the signal ambiguities that arise when the apparent brightness of the stacked objects alternates between light and dark.

Yet another object of the invention is to provide in a stacked object detecting and counting system means for overcoming the counting signal ambiguities that arise when the scanning sensor output signals representative of brightness, alternate between positive and negative slopes for successive ones of the stacked objects.

A still further object of the invention is to provide a new and improved stacked object detecting and counting system that normalizes the phase polarity of the sensor signal differential output of prior art devices to enhance the counting data pulse train and avoid the effects of brightness polarity reversals in the sensor output data.

The foregoing and other objects of the invention are achieved in the preferred embodiments of the stacked object counting system of the invention through the use of sensors whose effective imaged width on the stacked objects, either alone or in pairs, is very narrow relative to individual ones of the stacked objects. The resultant signal data is processed and differentially summed to yield a signal approximating the first derivative of brightness as the sensor array traverses the stack. This signal is then, in turn, rectified to normalize the phase polarity in accord with signal analysis to yield a counting wave train without the polarity reversals that result in counting errors. The nature of the invention and its several features and objects will appear more fully from the following description made in connection with the accompanying drawings.

DESCRIPTION OF THE PREFERRED EMBODIMENTS

Figure 1:
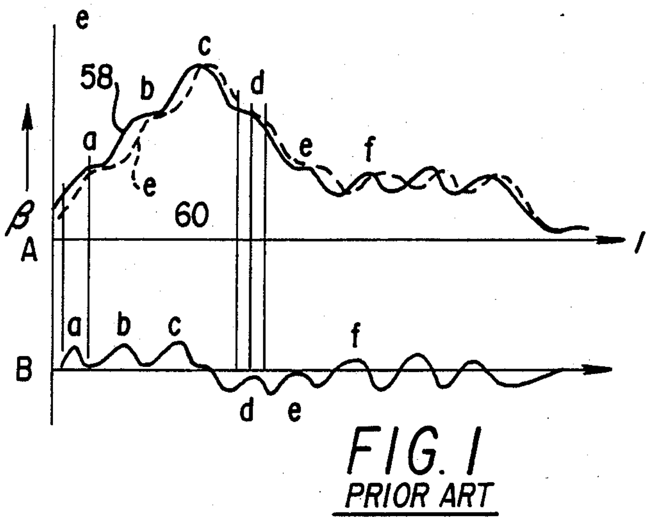
FIG. 1 PRIOR ART
FIG. 1 is a waveform diagram illustrating the output characteristics of a pair of sensors of the prior art.

The concept of utilizing a pair of sensors in a "pitch-match" mode to improve the method of generating non-ambiguous counting signals from a sensor array traversing the edges of a stack of sheet-like objects having essentially no brightness gradient between adjacent stacked objects, is discussed in detail in the Willits patent beginning at column 7, line 27 where reference is made to a drawing here reproduced as FIG. 1. FIG. 1 is a reproduction of FIG. 5 of the Willits patent with reference letters and numerals indentical to those there employed and the disclosure of that invention should be consulted for a detailed explanation of FIG. 1. As there shown, sensors 58 and 60 generate signals shown as e 58 and e 60 as the sensors traverse the stacked objects from a to f (etc.). If these two sensors are connected in parallel opposition, or differentially summed, their composite output wavetrain is as shown in FIG. 1B and this wavetrain is an approximation of the first derivative of brightness across the objects comprising the stack.

From a close inspection of the brightness signature of FIG. 1, especially in the area of FIG. 1B as the sensors traverse objects c and d, it can be seen that as the brightness gradient went darker, a negative inflection of the differential pitch matched cell pair data occurs. Further, so long as the brightness slope continued in either a positive or negative direction or stayed constant, except for any minute interstitial contrast area, the FIG. 1B data generated remained unambiguous.

As described above, there are instances where there is a discrete brightness gradient polarity change from sheet to sheet of adjacent elements comprising the stack. That is, if the brightness gradient alternated between positive and negative as it would if in FIG. 1A, edge c is brighter than d (as shown) but instead of as shown e is as bright as c and f as dark as d, etc. the summed output train of data would revert to a sub-harmonic of the desired output count frequency and ambiguities in count data would occur.

Figure 2:
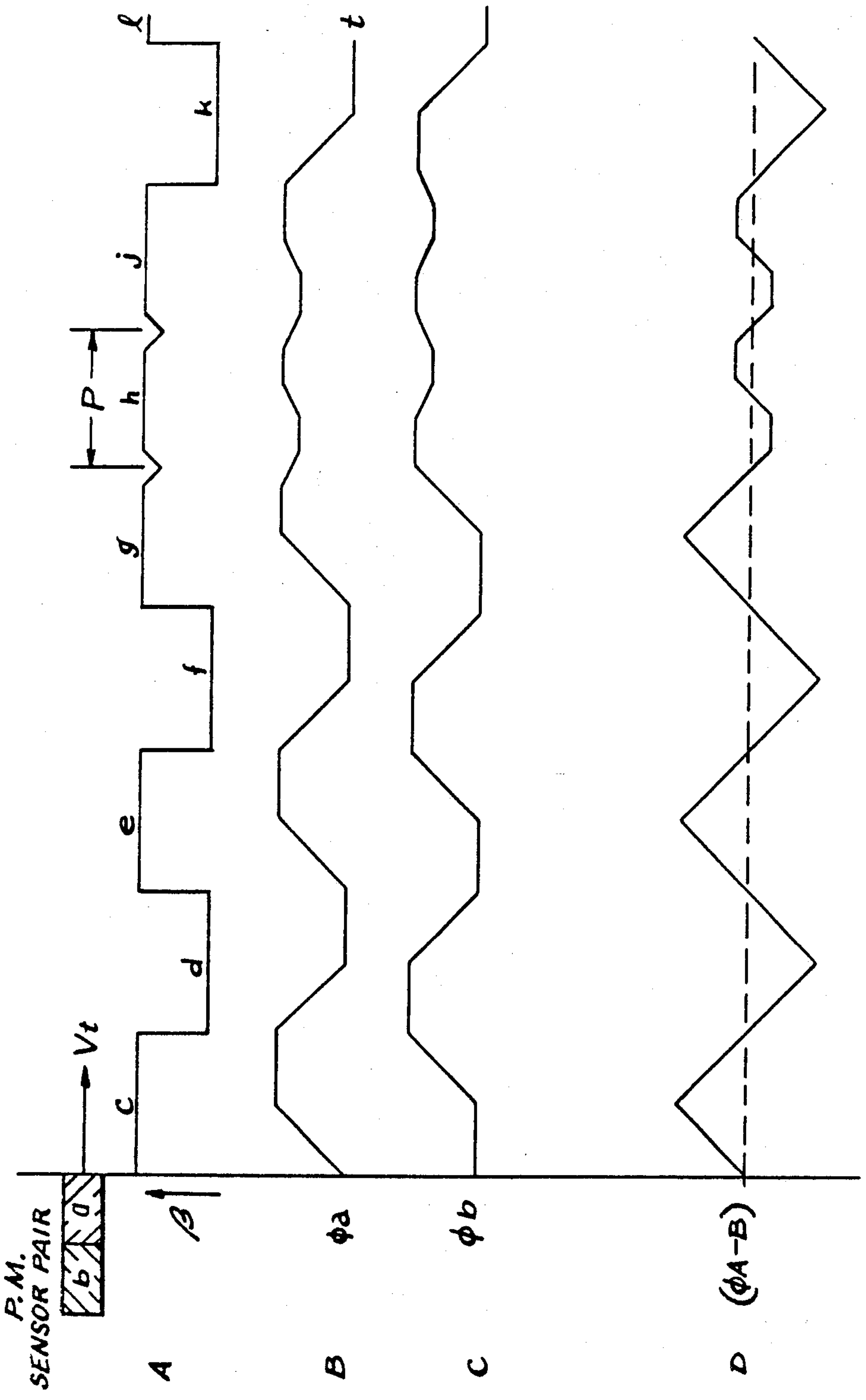
FIG. 2 is an idealized waveform diagram illustrating the presence of sub-harmonic and fundamental harmonic signal data where stacked element to element brightness reversals occur.

FIG. 2 illustrates graphically the suppositions made above with respect to the generation of ambiguous sub-harmonics with particular sheet materials. In FIG. 2A, the elements c through 1 of the stacked materials are shown as having a pitch P and brightness $\beta$ with the brightness base line omitted and just the sheet to sheet modulation shown. A cross-hatched representation of a sensor pair pitch-matched to the pitch P of the elements is shown above FIG. 2A. If the sensor pair is caused to traverse the elements at a linear velocity $V_t$, sensor a will generate the output wave form of FIG. 2B and sensor b the waveform of FIG. 2C. FIG. 2D shows graphically the differential data generated by the sensor pair as it traverses the illustrated brightness gradient of alternate reversals of brightness and the ambiguous counting data so generated which comprises both sub-harmonic and fundamental harmonic signal data.

Figure 3:
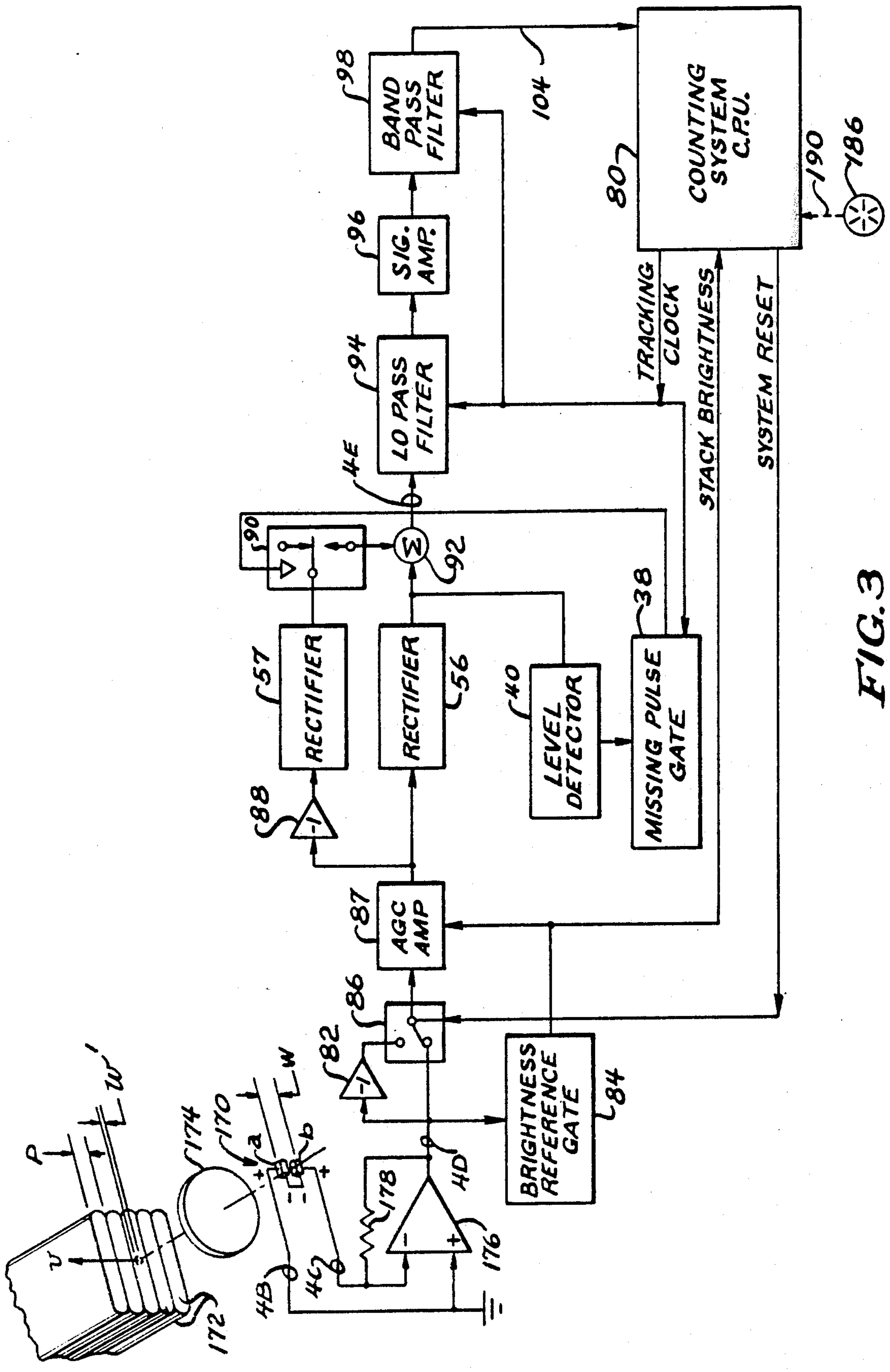
FIG. 3 is a schematic, partially in perspective illustrating an inventive embodiment having a non-pitch matched sensor pair having data processing circuitry that overcomes the generation of sub-harmonics of the counting frequency in its output data.

It is a feature of the invention that the invention embodiment shown in FIG. 3 circumvents the appearance of the foregoing described ambiguities in signal data that otherwise occur when there are alternating brightness polarity gradient reversals as a sensor array traverses the edges of a stack of material having alternately light and dark appearing sheet edges. In FIG. 3 a light source is assumed present but is not shown for simplicity of illustration. A sensor array 170 comprised of sensors 170*a* and 170*b* of width W is imaged on a plurality of stacked objects 172 by objective lens 174; the effective width of sensor array 170 imaged on the stack being w. The effective width w of sensor array 170 is made as narrow as possible compared to the pitch P of the stacked material 172. As shown in FIG. 3, the output of sensor array 170 is the input to differential summing preamplifier 176 with its associated feedback resistor 178. The output of amplifier 176 is the first derivative of brightness but contains ambiguities as shown in FIG. 4D whenever there are brightness polarity reversals.

While the optical system of the FIG. 3 embodiment and those shown and described below in connection with further embodiments is functional, it should be understood that as shown they are schematic only. There is described in connection with FIGS. 11-13 a preferred optical embodiment useful in all of the invention embodiments to reduce specular reflections from the surface of the edges to be counted.

Figure 4:
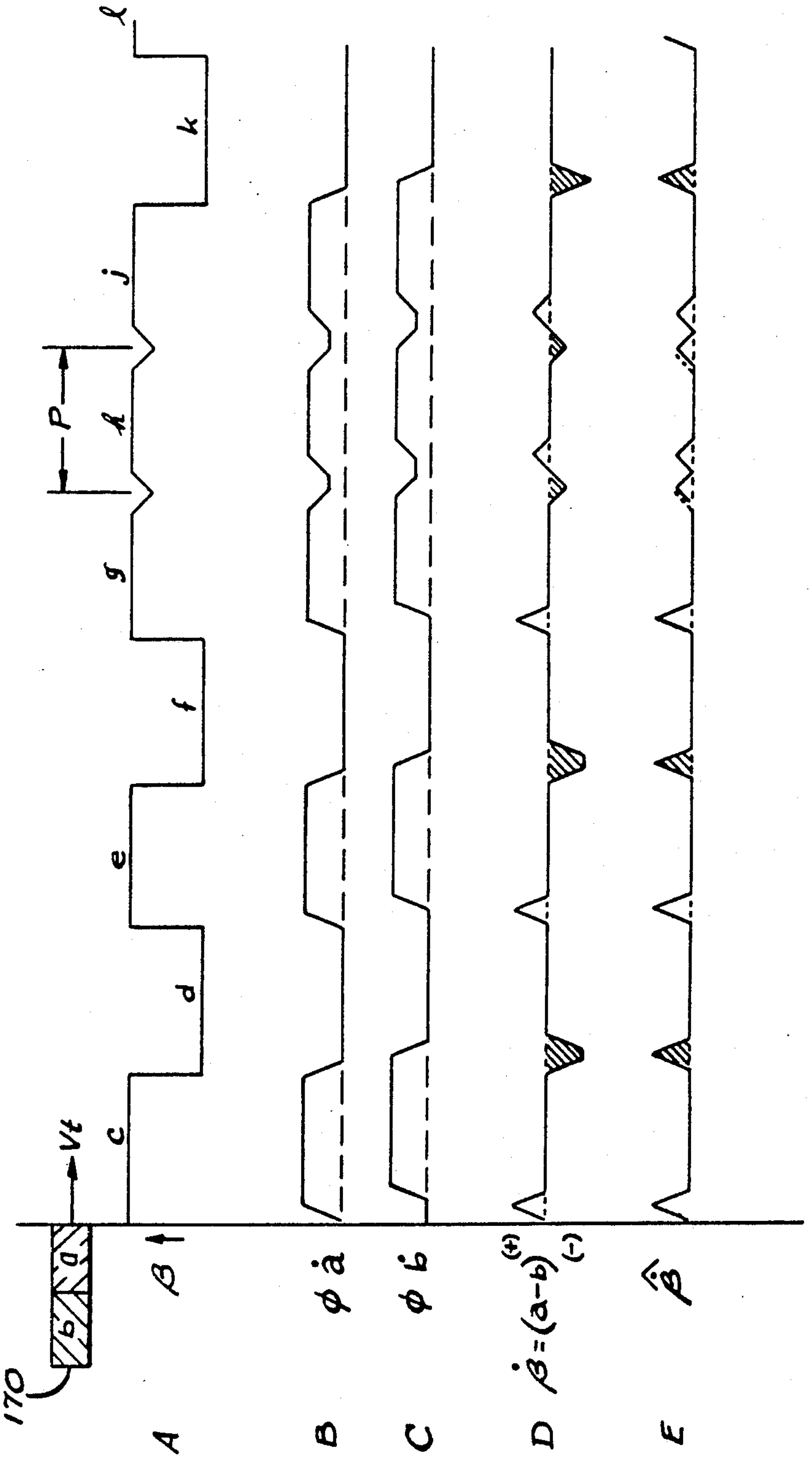
FIG. 4 is a waveform diagram illustrating output waveforms from the paired sensors of FIG. 3 and of the corresponding waveforms appearing at various points in the circuitry of FIG. 3.

The signal wave trains appearing in various parts of FIG. 3 are shown in FIG. 4. In FIG. 4, sensor array 170 is shown near the top of the waveform diagram. As sensor array 170 traverses the stacked elements 172 shown at A in FIG. 4 where the brightness $\beta$ base line is omitted. The outputs of the two sensors for a highly idealized series of elements is shown at FIGS. 4B and 4C. The locations where these signals appear are located on FIG. 3 where they are designated as 4B and 4C. The differentially summed pre-amplified output of amplifier 176 is shown in FIG. 4D.

It is an invention feature that the signal ambiguities that arise when sheet edges alternate in brightness between positive and negative, are eliminated through rectification of the differentially summed sensor output. The differentially summed sensor array signal is coupled to full wave zero offset rectifier 56 through electronic switch 86 and AGC amplifier 87, whose function will be described below, to effect the desired rectification with the output signal, free of ambiguities, appearing as in FIG. 4*e* at the rectifier output. That rectifier output is coupled through summing amplifier 92 and is further processed in low pass tracking filter 94, amplified in signal amplifier 96 for additional band pass filtering by tracking filter 98 to provide the required sheet count cyclic data on line 104 as an input to the counting system central processing unit 80 where the cyclic data will be converted to a total sheet count. Both low pass tracking filter 94 and band pass filter 98 have their filtering characteristics established by a "clock" frequency input to the filters that is output from CPU 80. The clock may be a voltage controlled oscillator whose output frequency is made to track the setting of pitch dial 186 connected to the CPU 80 by linkage 190 where it establishes the control voltage setting for the "clock" considering a fixed scan velocity.

For simplification of the final counting in CPU 80, it is desirable that the output wavetrain of rectifier 56 as subsequently filtered and input to the CPU be of a known selected polarity. This is accomplished by the CPU 80 working in conjunction with inverter amplifier 82 and electronic switch 86. CPU 80 generates a reset pulse to reverse the setting of switch 86 and hence the polarity of its output whenever CPU system inputs on line 104 are not of the selected polarity. Inverter amplifier 82 then provides an opposite polarity signal as one input to switch 86 as compared to the input from amplifier 176.

Because the brightness of the stacked materials edges varies over wide limits and it is desirable to operate the counting system and other circuitry in a range where possible noise and other extraneous count data are eliminated, circuit elements are incorporated for maintaining signal gain by AGC amplifier 87 throughout the system following amplifier 176. The composite signal at the output of amplifier 176 is continuously sampled by brightness refernce gate 84 for the purpose of determining if the sensor head is looking at stacked material and setting system brightness reference level for the specific stack which is maintained as a control signal at gate 84's output to AGC amplifier 87 and the counting system CPU 80 to supply logic inputs to counter voids in the stack.

Inverter amplifier 88 and full wave zero offset rectifier 57 are used to supply any missing counting pulses at the output of recifier 56. Level detector 40 continously monitors the output level of rectifier 56. When that output level falls below a preselected level indicating the absence of a pulse, missing pulse gate 38 to which its output is connected, generates a gate pulse whose duration and frequency are determined by the clock pulse at its input. The gate pulse closes electronic switch 90 to gate an inverted counting pulse from rectifier 57 for "fill-in" data in the signal wave train to which it is added by summing amplifier 92. The composite signal formed by summing the rectified output of AGC amplifier 87 with periodic missing count contributions from the opposite polarity derivative is then filtered and processed as described above.

Figure 5:
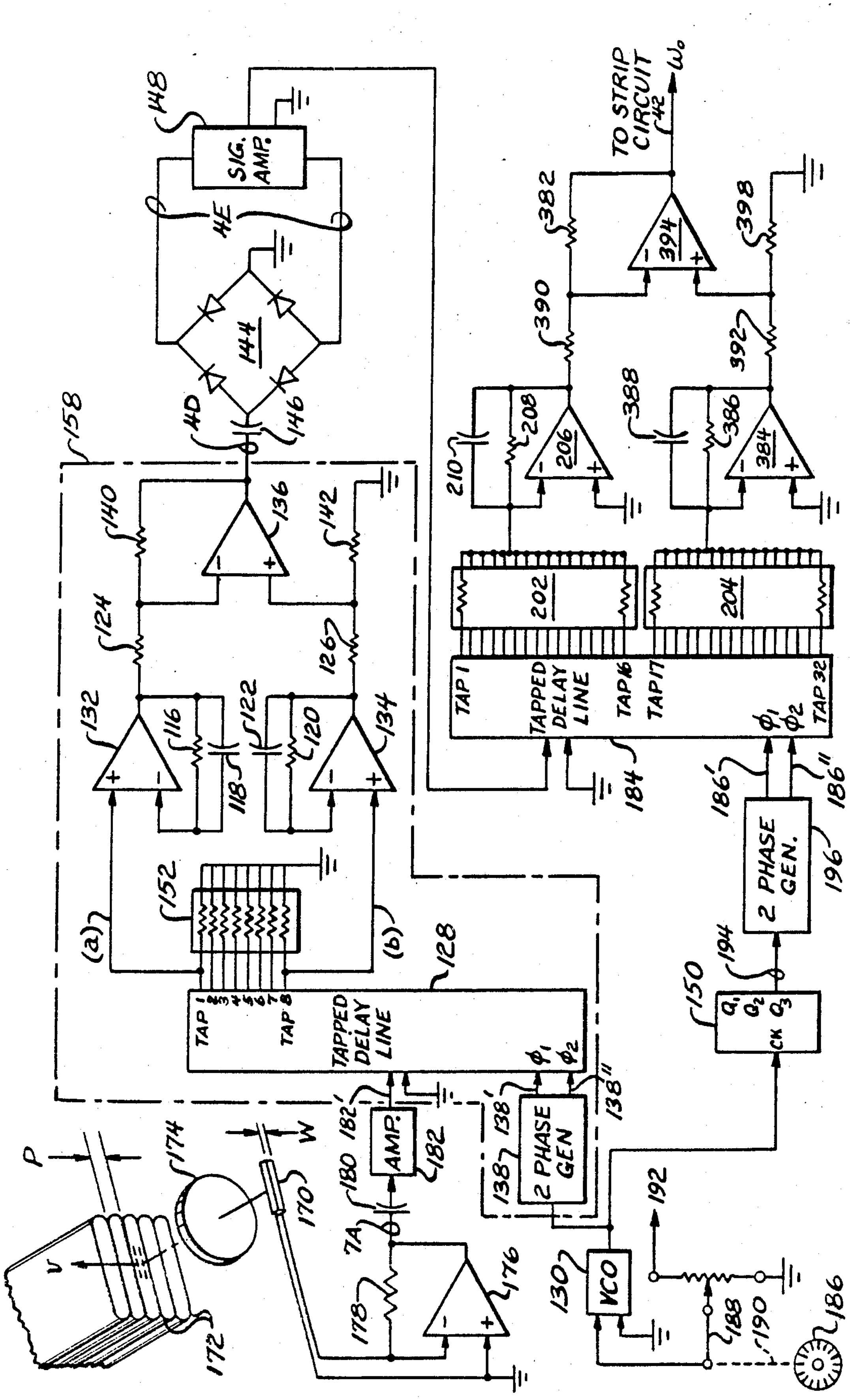
FIG. 5 is a schematic, partially in perspective illustrating an invention embodiment having a single very narrow sensor whose output is converted to that of a non-pitch match sensor pair with subsequent data processing that eliminates sub-harmonics in the output signal data.

FIG. 5 illustrates an inventive embodiment having a single very narrow sensor whose output is converted to that of a non-pitch matched sensor pair with subsequent data processing that eliminates sub-harmonics in the output signal data. In the FIG. 5 system, brightness derivatives are developed utilizing a single very narrow sensor to synthesize an equivalent spatial sensor pair as required to generate the first derivative of a brightness gradient.

Figure 10:
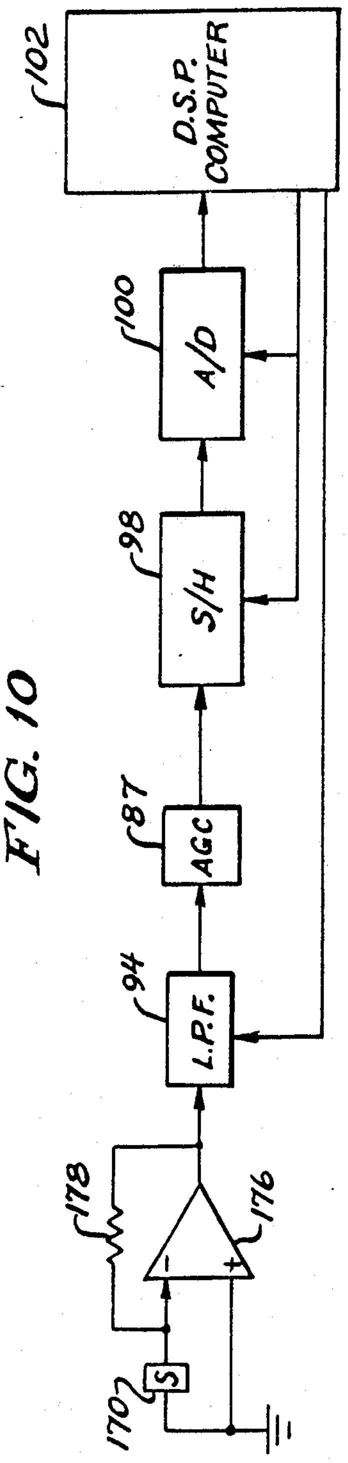
FIG. 10 is a system block diagram of an inventive embodiment adapted to digital signal processing of the scanning sensors output.
Figure 9:
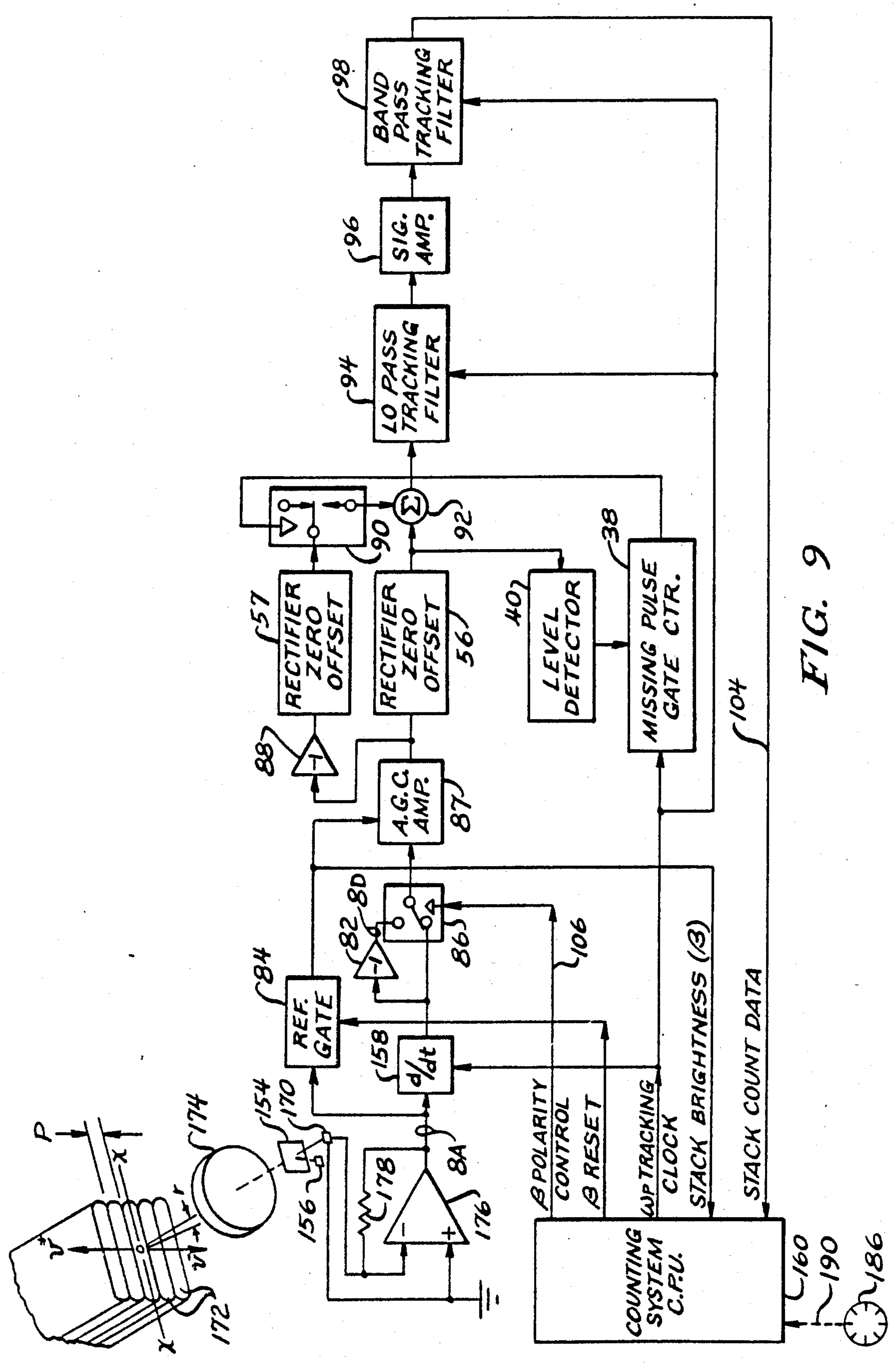
FIG. 9 is a schematic, partially in perspective of a generalized embodiment of the inventive system as adapted to a computer controlled counting system.

In FIG. 5, a single narrow sensor of width W is imaged on stacked objects 172 by objective lens 174, the effective width of sensor 170 imaged on the stack being w and being much narrower than the thickness P of one of the stacked objects 172. As in FIG. 3, the source of illumination of the stacked objects 172, is not shown to simplify the drawing presentation. As discussed in the Mohan 1 patent, if the image of sensor 170 is caused to traverse the stacked material at a known velocity V, the data from the sensor for each thickness P of the stacked elements 172, incorporates many signal ambiguities which, if not removed, will generate false counting data. FIGS. 9 and 10 of the Mohan 1 patent are reproduced here as FIGS. 6 and 7, respectively, for reference with unchanged reference numerals so that their description in that patent can be compared to the disclosure of this invention where identical elements bear identical reference numerals.

Figure 7:
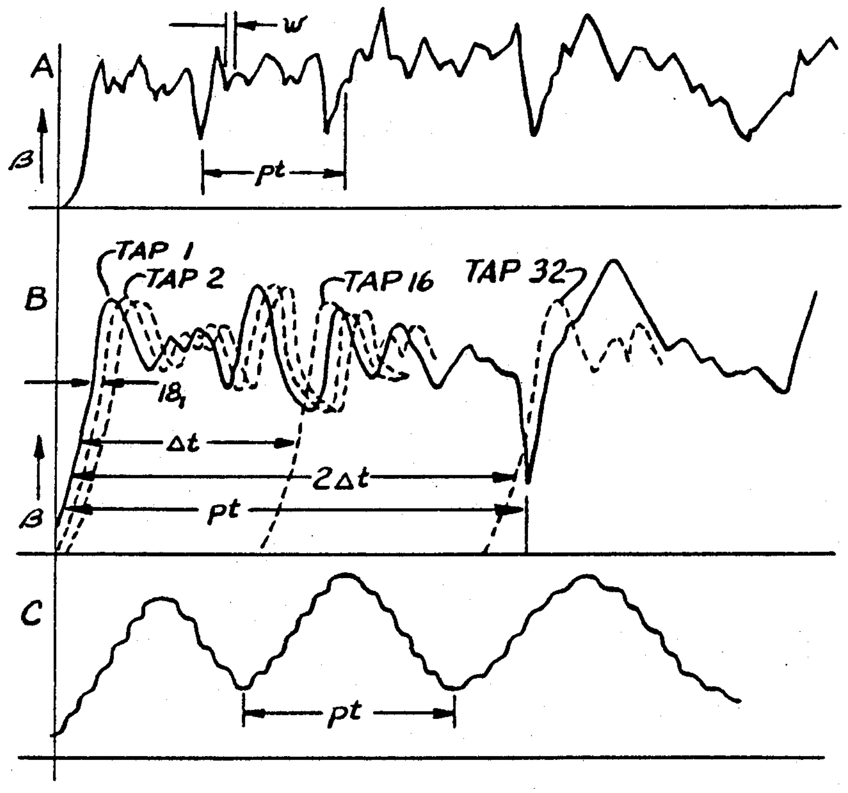
FIG. 7 PRIOR ART
FIG. 7 A–C are waveform diagrams illustrating time sequenced sensor output data of the prior art and the result of combining this data.
Figure 6:
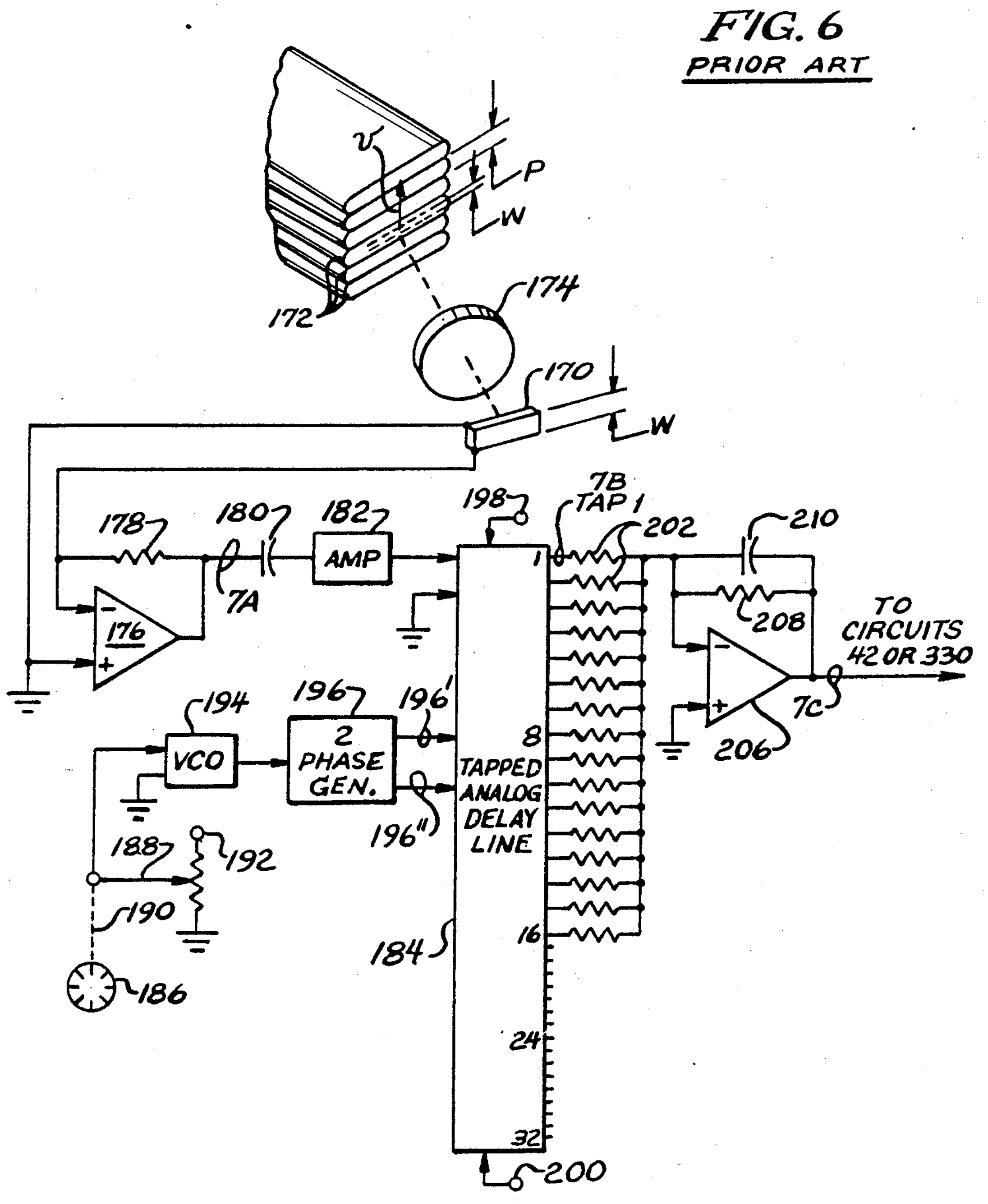
FIG. 6 PRIOR ART
FIG. 6 is a schematic illustration of a prior art counter using electrical means to adjust the width of a single narrow sensor so that its output signal is the equivalent of $\frac{1}{2}$p.

In FIG. 5, instead of directly converting the sensor output data into the desired line-pair data as shown in FIGS. 6 and 7 and as described in the Mohan 1 patent, this data after amplification in preamplifier 176 with its associated feedback resistor 178 and further amplification in amplifier 182 to which it is coupled by capacitor 180, is fed into a brightness derivative generator 158 comprising a first fast clocking tapped analog delay line 128 with associated processing elements described and explained below. The output at tap 1 of analog delay line 128 is basically a real-time data train and tap 8 is so clocked by voltage controlled oscillator 130 and two phase generator 138 so as to produce a signal delay of 1/256 of an average cycle of the per sheet edge counting frequency.

In FIG. 7, P is the wave length time interval of sheet to sheet count frequency having sixteen sample intervals ($\Delta t$) per half cycle as the data transfer rate for delay line 184 of FIG. 6. By contrast, the sampling rate of fast clocking delay line 128 of FIG. 5 in a preferred embodiment is eight times as fast and thus gives its input data train a delay interval of 1/256 of a cycle per count cycle between its adjacent taps. Using output tap 1 of delay line 128 as a pseudo sensor designated as "a" and the output of tap 8 as a pseudo sensor designated as "b", these high impedance output lines are buffered in amplifiers 132 and 134 respectively. Passive resistive tap load 152 to ground prevents the introduction of extraneous signals and stabilizes the delay line outputs. Taking the differential sum of these synthesized data trains in amplifier 136 yields a good approximation of the first derivative of brightness by pseudo sensors a and b separated in time by 1/32 of a data cycle. See FIG. 4D. Amplifier 136 has feedback resistor 140 and resistor 142 to ground.

The sensor outputs of both FIGS. 5 and 6 are as shown in FIG. 7A and illustrates the presence of ambiguities and is illustrative of the higher harmonics generated when a very narrow sensor, in effect profiles the surface brightness of the edges it traverses. FIG. 7B illustrates the waveform and delay present at the outputs of the various taps of the delay line–either 128 in FIG. 5 or 184 in FIG. 6; of course in the FIG. 5 embodiment, the actual delay would be less because of the higher clocking rate. As shown and described in the prior art example of FIG. 6, summing the outputs of an appropriate number of delay line taps can yield the unambiguous output signals of FIG. 7C where there are no sheet-to-sheet brightness polarity reversals. However, where these reversals are present, the prior art system of Mohan 1 does not output unambiguous data. It is a feature of the invention that this limitation of the prior art is overcome in the FIG. 5 invention embodiment by full wave rectifying the output of amplifier 136 in rectifier 144 to which the amplifier is coupled by capacitor 146. The output of amplifier 136 is illustrated in FIG. 4D and the output of rectifier 144 in FIG. 4E. As can be seen, the wave form of FIG. 4E contains none of the ambiguities of FIG. 4D but is in a form that requires enhancement to promote accurate counting.

Figure 13:
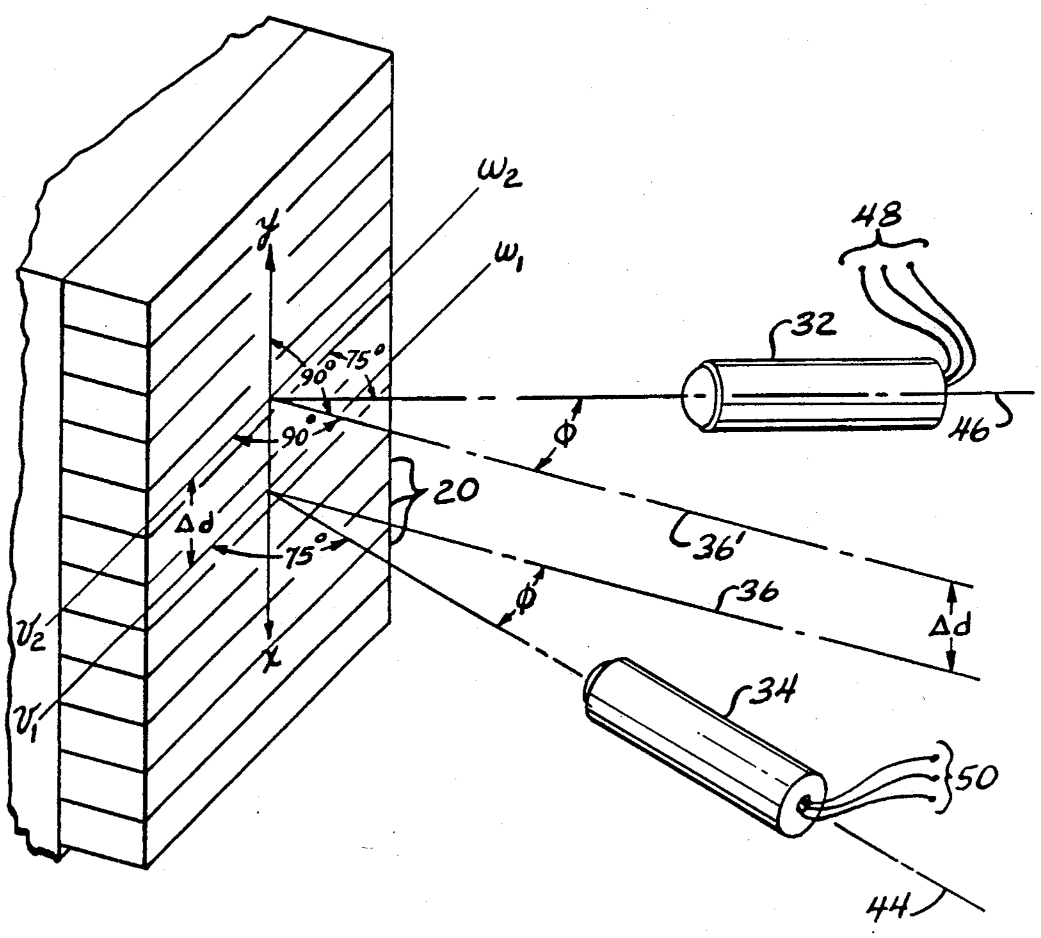
FIG. 13 illustrates a preferred embodiment of a dual optical-sensor system employed in the invention.

It is a further invention feature that amplification of the output of rectifier 144 by signal amplifier 148 and its subsequent processing in a circuit containing a second tapped analog delay line 184 supported by circuitry identical to that of FIG. 13 of the Mohan 1 patent, provides the enhancement needed for fast accurate counting of the sheet material edges. Refer to the description of FIG. 13 in the Mohan 1 patent for a complete description of the circuitry following signal amplifier 148. However, because voltage controlled oscillator 130 is operating at a rate approximately eight times the normal input into delay line 184, a divide by eight counter 150 is interposed between VCO 130 and 2 phase generator 196 to achieve the same results at the output of delay line 184 as described in the Mohan 1 patent.

In the foregoing description of FIG. 5, the clocking rate from VCO 130 and 2 phase generator 138 for first delay line 128 can be established for any convenient multiple sample rate higher than the count sampling rate, as well as the tap separation of pseudo sensors "a" and "b". The higher the clocking rate the greater the separation of tap "a" and "b" can be for the same fraction of a cycle of data delay chosen for developing the brightness derivative. Along with this higher clocking rate is the advantage of clock noise filtering to avoid aliasing in the second delay line by common mode rejection in amplifier 136.

The idealized wave forms of FIGS. 2 and 4 are representative of a particular situation where alternate sheets of a stack are either brighter or darker than their adjacent sheet. In such an instance the brightness derivative (a–b) of FIG. 4D has alternating polarity of equal amplitude. Thus, scanning the sensor either up or down the stack will not change the magnitude of the derivative but the polarity would change. Thus either direction of scan has the same quality of data and such is not always or even usually the case.

Figure 8:
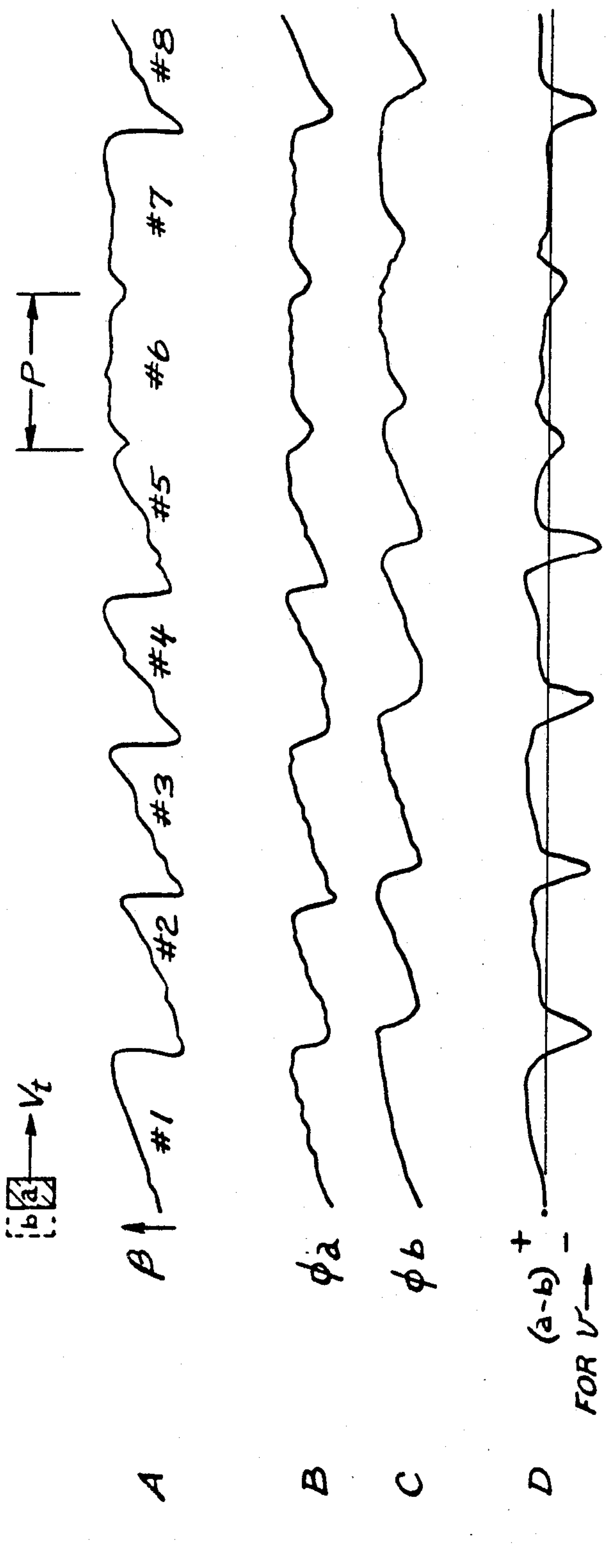
FIG. 8 is a waveform diagram illustrating the brightness signatures where each of the elements in a stack has a gradually increasing brightness.

FIG. 8A shows the brightness signature of a stack where each element has a gradual brightness increase followed by a brightness drop at the beginning of the next element and then a gradual brightness increase followed by a brightness drop at the beginning of the next element and then a gradual brightness increase again, etc. FIGS. 8B and 8C illustrate the output of the sequential scanning sensors a and b as they traverse such a stack and, in FIG. 8D which illustrates the brightness derivative (a–b), there is a marked polarity preference in negative polarity during the up scan direction if we consider FIG. 8D to represent the "up scan" direction. Thus, for sheet material stacks having the brightness characteristic such as shown in FIGS. 4 and 8, there exists a need to know and to utilize the direction of scan that best generates the most useful data indicative of the sheet count in a stack. The inventive embodiment of FIG. 9 is well adapted to resolve the problems inherent in counting stacked sheet materials where the elements have the combination of characteristics shown in the diagram of FIGS. 4 and 8.

FIG. 9 is a system diagram of an inventive embodiment adapted to a computor controlled counting system. A movable scanning sensor head is comprised of a coaxial optical system consisting of lens 174, beam splitter 154, an illumination source 156 and a sensor 170 whose width along the +v, −v axis is effectively very narrow as compared to the width P of an element in the stack of material 172 to be counted. Illumination source 156 advantageously may be a light emitting diode. Alternately, the light source could be restricted in size and the sensor relatively larger to achieve the equivalent optical parameters. There would also be provided a mechanism, including an optical component holding frame not shown, to cause a linear velocity scan of the scanning head in one or more directions along the +v, −v axis. This type of optical arrangement is well known and variations of it are frequently encountered in the bar code reader art except here, there is incorporated a mechanism to allow constant velocity scanning in one or more directions.

As a scanning movement of the scanning head progresses, the output of sensor 170 profiles the brightness characteristics of the stacked sheets 172 and supplies the impedance buttered scan data from preamplifier 176 as a signal 8A (FIG. 8A), to brightness reference gate 84 and brightness derivative generator 158. Brightness reference gate 84 supplies the central processing unit 160 logic circuitry with a brightness threshhold gate signal $\beta$ indicative of the average brightness of the stacked material 172 as compared to the low-level of brightness just prior to encountering the stacked material in the "up" scan direction which is here defined as from −v to +v. Brightness threshold gate 84 also provides the same output as an input to AGC amplifier 87. The signal output of brightness derivative generator 158 (FIG. 8D), which advantageously may be comprised as shown and described in connection with FIG. 5, is supplied as a bi-polar input to inverter amplifier 82 and to electronic switch 86. Similarly, the inverted polarized data train out of inverter amplifier 82 is also supplied to switch 86.

The initial polarization of the data train (FIG. 8D) into the AGC amplifier 87 is determined by computor logic as modified by scan direction and by the sheet edge brightness gradient, to normalize this data train and provide a preferred "positive" polarity for the FIG. 8D wave train as the data output of the AGC amplifier 87. How this is accomplished can be seen by reference to FIGS. 8 and 9. If the sheet-to-sheet brightness characteristics of the stacked sheets are as shown in FIG. 8A, it can be seen that the FIG. 8D derivative signal shows an average preference for a negative derivative. Thus, to achieve the positive polarity preferred as the output of AGC amplifier 87, the polarity control line 106 to switch 86 signals that switch to select the inverter amplifier 82 output as the input to AGC amplifier 87 and thus inverts its output polarity to positive on the average. The polarity control signal $\beta$ on polarity control line 106 is selected by CPU 160 based on analysis of input count data from filter 98 on line 104.

The remainder of the data processing after AGC amplifier 87 is as described in connection with FIG. 3 with level detector 40 and missing pulse gate 38 signaling switch 90 to supply necessary fill in data from inverter amplifier 88. The output from band pass tracking filter 98 is supplied to central processing unit 160 where it is converted to a stack count. Servo control of the voltage controlled oscillator and the scan drive system both of which have been described in the prior art Mohan 1 and Mohan 2 patents is not shown or described herein but these may be incorporated as desired in the same fashion as described in the prior art.

FIG. 10 illustrates a system embodiment adapted to digital signal processing of the output of sensor 170. After analog signal conditioning by preamplifier 176, the voltage signal at the amplifier output is applied to lowpass tracking filter 94. Filter 94 serves to attenuate undesired high frequency aliasing components in the sensor signal prior to a subsequent sampling operation. As in other embodiments of the invention, filter 94 has a sampling frequency input to adjust its filtering characteristic to the anticipated pitch of the stacked sheets of material to be counted as will be described below. The filter bandwidth is made adjustable to maintain a relatively constant sample rate/filter cutoff frequency ratio as the sample rate is adjusted to adequately sample the sensor data over a broad range of material pitch. The filter cutoff frequency, and hence the system sample rate, must be sufficient to allow discrimination of sensor inflection points which are composed of frequency components considerably higher than the repetitive sensor data rate.

The filtered sensor output is further amplified by automatic gain control stage 87 to a level which makes most efficient use of the analog to digital converter input range. The amplitude normalized analog signal at AGC 87's output is then sampled with a very short time aperture and held until the next sampling time by the sample and hold device 98. The analog signal is then quantized and encoded in digital form by the analog to digital converter 100 for use by the digital signal processing computer 102.

The digital signal processing computer 102 is used to implement discrete time realizations of all of the analog signal functions described in the previous system embodiment. Simple and direct realizations can be obtained for those analog functions previously making use of the tapped delay devices, since these devices are configured for hardware implementations of finite impulse response digital filters. In the FIG. 10 embodiment, delay line taps are replaced by computer memory, tap weighting and summing operations are replaced with multiplication and addition, and the adaptive/-tracking filter characteristics obtained by clock frequency variations on the FIG. 8 and 9 embodiments are obtained in this embodiment by varying the sampling frequency. Thus, the derivative sensor signal formed by the tapped delay device can be directly implemented after sampling by a proper choice of sampling frequency, subtraction of suitably spaced sample points, and proper amplitude scaling. More desirable differentiator characteristics can be obtained by use of standard digital filter design techniques. Similarly,the electrically simulated "pitch match" sensor line pairs are created from weighted sums of stored sample sequences. Through the use of properly selected weighting sequences, the desired bandpass characteristics can be achieved. The remainder of signal functions required to implement a counting system, such as algorithms for evaluating the count signal, line pair phase comparison, and count storage are also easily implemented within the computer.

While the various scanning and data processing methods disclosed in the Mohan 1 and 2 and the Willits patents and the Mohan 3 patent all deal with the various problems encountered in counting stacked objects, there will always be additional problems requiring a particular solution as methods of manufacturing change and as new types of materials comprising the stacked object appear in the market place. Credit cards, such as the high-value cards used in the banking industry and various service companies, are examples of such constantly changing materials that require very high accuracy counting.

Presently, the majority of high value credit cards are manufactured by laminating a very thin clear plastic cover sheet to each side of a much thicker center core stock of solid plastic. The center core stock can be of a solid color of homogenous material, usually plastic in nature or on the more prestigious type card, the center core stock can be a flecked, usually golden or silver, mixture of material; to give a special appearance to the finished product. The composite edges of these cards present difficult scanning problems to optical-non-contact counters if non-ambiguous data is to be produced.

The spatial filtering technique utilized by the pitch-match counting systems as disclosed in the Willits and Mohan 1, 2 and 3 patents, go a long way in solving this problem in counting, but there isn't one scanning or imaging technique that is a solution to all of the various reflectance signatures of edges of stacked material encountered in the present day credit card and sheet counting markets.

The co-axial illumination and sensing system shown in the Mohan 3 patent's FIG. 4, was utilized for a particular type of stacked material, wherein the edges of the material being counted were basically of highly specular reflective edge surfaces requiring a "fast" (low f. no) optical co-axial system to generate non-ambiguous counting data.

The co-axial illuminating and sensing system shown in the Willits patent, FIGS. 15, 16, 17 and 19 was adapted to a different particular type of stacked material. There, the core of the individual pieces of material comprising the stack was fluted paper and the edges were a thin sheet of paper glued to each side of the fluted center section. The illumination and sensing optical system in this case was a very "slow" (high f. no.) co-axial optical system, set to a large offset angle to the normal of the stack, utilizing the lambertian reflective characteristic of the large flute area to generate most of the reflective data to the sensor.

With the vast number and types of credit cards now present in todays market, the large majority of these are individually composed of multiple layers of various materials laminated together. With these laminated cards, the card edge optical characteristic is usually a combination of surfaces that are both specular reflective and lambertian reflective in nature.

It is a feature of this invention that the co-axial illumination and sensing system of Mohan 3 may be adapted to solve some of the ambiquities of optical data, that would be generated by a pure specular illuminated edge sensor system on a multiple laminated layered credit card.

Figure 11:
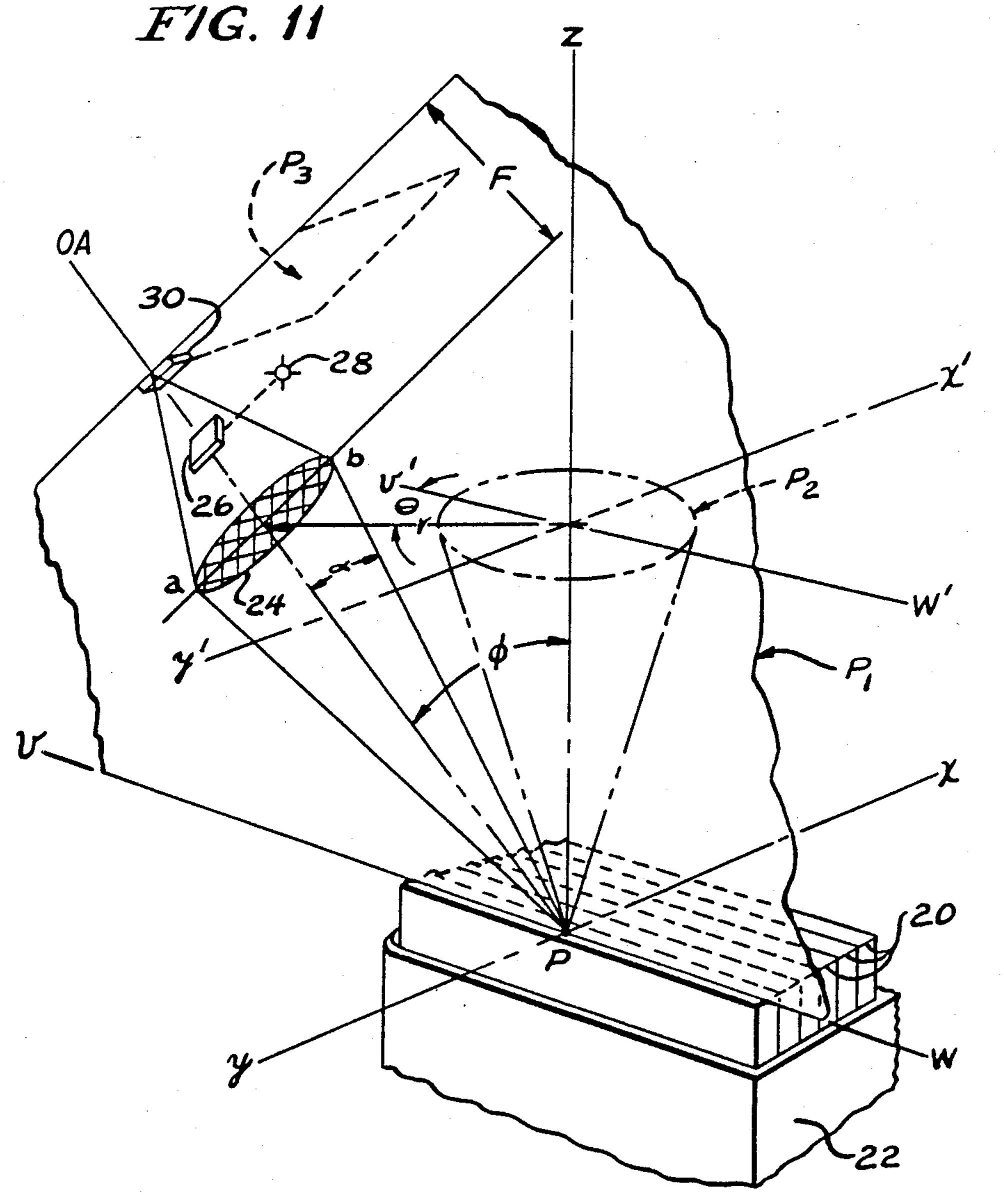
FIG. 11 is a schematic in perspective of a number of sheets of material to be counted with a diagrammatic representations of the optical-sensor system relative thereto.

FIG. 11 shows a partial stack of multi-laminated cards 20 in a box 22 and an imaginary vertical plane P1 that is normal to the card edge and parallel to the card outside surface. The long axis of the card edge is shown as (v,w), passing thru point P. At right angle to this axis, also passing thru point P and in the same horizontal plane as (v,w) is axis (x,y), which is along the direction of scan.

Coplanar to P, and offset by angle Phi ($\phi$) to $P_1$'s normal axis P. Z. is the co-axial illumination and sensor axis O. A. Optical axis O. A. is shown rotated down from vertical in plane $P_1$ by the angle Phi ($\phi$). Rotation, if any, of axis O. A. out of plane $P_1$ towards the (y,x) axis is defined by angle Theta ($\theta$). The lens 24, beam splitter 26 illumination source 28 and sensor 30 are in the same configuration as would be employed in a Commercial Bar Code Type Coaxial Light Pen. Plane $P_3$ is the focal plane of lens 24 and, contains sensor 30.

The maximum acceptance angle of the co-axial optical system is defined by the lens 24 (Input) aperature (a,b). The half solid angle of acceptance of this optical system is defined by angle Alpha ($\alpha$), which defines numerical aperature N. A. $=$ N Sin $\alpha$, where N is the index of refraction of the object space, and Alpha ($\alpha$) is the incident angle of the most extreme useful ray entering the system. The numerical aperature N. A. is among other things, a measure of the light gathering capabilities of an optical system. The speed of the optics (f no.) is related to N. A. by 1/f no. $=2$ N. A.

As described above, laminated cards 20 when comprising the edge view of the cards of stacked material to be counted have both lambertian and specular edge reflective characteristics. Since the data from an edge scanning sensor encountering such edge characteristics is often ambiguous, determining the best means of illuminating and sensing this edge that will generate the least ambiguous signal, as required for counting, is necessary.

A co-axial system when erected normal to a truly specular, for example, mirror surface can reflect directly back to itself since the angle of reflectance equals the angle of incidence. The most extreme ray detectable determines the acceptance angle Alpha ($\alpha$) which is defined by the "speed" of the optical system, i.e. (f number) or numerical aperature (N. A.). Knowing that a co-axial optical system with it's optical axis erected normal to a particular surface containing a mixture of specular and lambertian reflectors will generate some spurious optical data, it has been discovered that it is advantageous to tilt the optical axis of the system to some compound angle Phi ($\phi$), and Theta ($\theta$), relative to the normal of that surface and that such tilting will reduce the spurious data due to specular reflections.

A particular feature of the invention resides in the discovery that if the tilt angle Phi ($\phi$) is made equal to one-half or more of the acceptance angle Alpha ($\alpha$), specular reflection from the surface of the cards will be reduced by 50 percent while lambertian illumination remains nearly constant. With the tilt angle Phi ($\phi$) so established to eliminate 50 percent of the specular reflection, at that tilt angle the system is limited to the so called "working numerical aperature" (W. N. A.). If the tilt angle Phi ($\phi$) is made too large, the lambertian response from the edges will suffer excess loss due to the cosine function of brightness off a lambertian surface. When Phi ($\phi$) is greater than $\frac{3}{4}$ of the solid angle of acceptance, 2 $\alpha$of lens 24, lambertian response falls off to levels that are difficult to implement.

Figure 12:
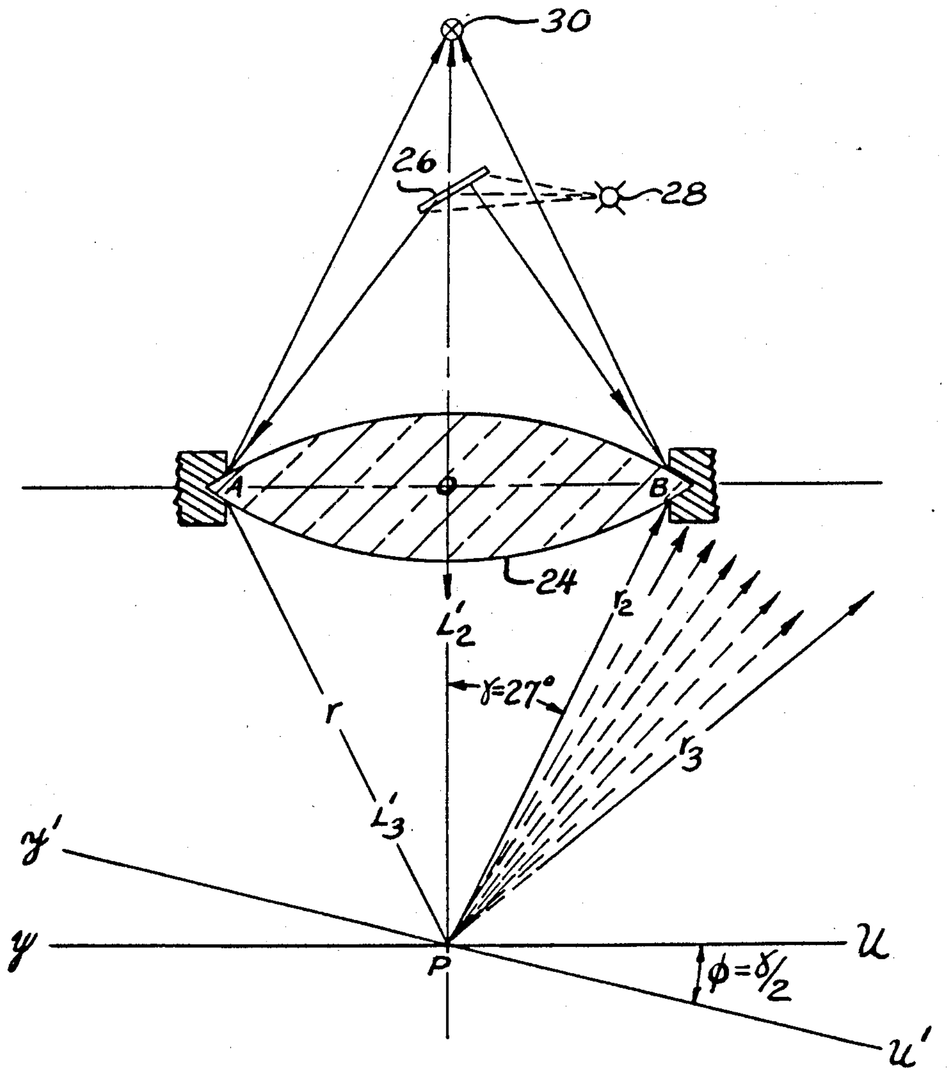
FIG. 12 illustrates in schematic perspective form the effect of rotation of the optical system of FIG. 11 out of the plane of the sheet material.

In FIG. 12, the object plane containing the specular target (P) is shown tilted relative to O. A. by the angle Phi ($\phi$). The tilted plane is normal to the page; it's tilt axis being (u', y'). As described, tilt angle Phi ($\phi$) is equal to one half of the lens acceptance angle Alpha ($\alpha$). From this geometry, half of the emitted radiation from the co-axial illumination source does not reflect specularly back to the optical system co-axial sensor, as shown by the incident ray ($i_2$)'s angle to plane y'u' to it's reflected ray (r2) and incident ray ($i_3$)'s angle to it's reflected ray ($r_3$) and all included ray's between these two extremes.

From an examination of these relationships, it has been discovered that: (1) For a co-axial optical system for counting surfaces containing some specular reflection, the optical axis should be tilted relative to the surface normal by an angle equal to or larger than half of the angle of acceptance Alpha ($\alpha$) of the optical system. Where Alpha ($\alpha$) is the angle defined by N. A. =N. Sin ($\alpha$). In FIG. 12, Alpha ($\alpha$) is the angle who's Sine is OB/PB.

If, in the FIG. 11 drawing, it is assumed that the tilt angle of Phi ($\phi$) has been established as explained in connection with FIG. 12, the optical axis aspect angle Theta ($\theta$) relative to viewing point (P) can be in the plane ($P_1$) (ie, 0° or 180°) or rotated about axis Z-P to another viewing direction angle Theta ($\theta$). If the scanning direction of the stack by the optical system is along the (x,y) axis and scanning can be in either direction along this axis, then the scan optical signature will be greatly modified by the direction of scan and viewing of the point (P). If first the tilt angle ($\phi$) is selected and then rotated 90° in either direction along the (x'y') axis, i.e. $\theta$ is ±90° relative to v', w' axis, this will radically change the data train characteristic as a function of scan direction. With such tilt and rotation angles, the forward scan data train signature as compared to the backward scan data train signature will have totally different cyclic data characteristics.

In order to maintain reasonable identical data train signatures while scanning in either direction along the (x,y) axis on a stack, it is best to keep the optical axis (O. A.) viewing direction angle ($\theta$) within a few degrees of the plane ($P_1$) along the (v) or (w) axis. Tilting the optical axis toward the y' axis if the direction of scan was from (y) to (x) causes scan data enhancement of the leading edge of the card as seen going from y to x, while scanning backward from x to y with angle ($\phi$) still tilted to the y' direction, the backward view of the leading edge is now much less enhanced than in the opposite direction. If the tilt angle Phi ($\phi$) was tilted out along the x' axis, the reverse would be true. For maximum unambiguous data, the tilt angle Phi ($\phi$) should lie in the $P_1$ plane toward either the v or w axis, i.e. viewing direction angle $\theta$=0° or 180°.

FIG. 13 shows a pair of co-axial optical systems of the Commercial Light Pen type used in Bar Code Readers configured in a preferred manner with their optical axis displaced from the normal axis 36, 36' by the angle Phi ($\phi$). This angle is positive for sensor 34 and negative for sensor 32. These O. A., 44 and 46 respectively, are in parallel planes normal to the v.w. axis. The purpose for the two different angle polarities, as well as two separate sensing heads, is to insure a redundent sensing system to minimize counting errors in hi-value cards. For counting high value cards which conform to the standards established for the credit card industry by the A. B. A. credit card specifications, it has been found that the co-axial Bar Code Readers are adaptable to counting these cards if specific operating parameters are employed.

Since the optical systems of the light pens 32 and 34 are basically co-axial systems with a determinable numerical aperature, they should be offset from the normal along the v,w axis by the specified angle Phi ($\phi$) determined as described above. Having a relatively small "spot size" effective sensing area as compared to the width of the individual cards comprising the stack, the relative effective width of the sensor can be pitch matched to the card size either by the method taught in the prior art by Mohan 2 in connection with the description therein of FIG. 4 or by the optical equivalent of spatial filtering by matching the width of the sensor to the preferred percentage of the width of the card, as disclosed by Willits and using the optical system of this Bar Code Reader out of focus to effectively increase the sensing area. This is accomplished by placing the total optical unit as manufactured either closer to the target area or further away from it's sharp focus distance.

Frame means for supporting the co-axial two sensor system of FIG. 13 and means for positioning the co-axial sensor system in the preferred angle Phi ($\phi$) to the stack is not shown in FIGS. 11–13 for simplicity of discussion. Electrical connections for sensor 34 are shown at 48 and for sensor 34 at 50. Also, means for driving the sensor system in a forward and reverse constant velocity for scanning has also been omitted for the simplicity and since no part of the drive system forms a part of the invention.

In the foregoing description of a system for eliminating ambiguities from sensor data as occurs in prior art stacked sheet counting systems when the polarity of adjacent sheets has reversals, particular means have been described for attaining the derivative sensor signals required for accurate counting and eliminating the effects of ambiguities. However, it should be understood that other means exist for attaining the required derivatives either by analog or digital delay devices. Further, in the discussions of the sensor optical systems, particular systems were described. However, any optical system that meets the requirements for attaining effective sensor width such as those practiced and described in the prior art Willits and Mohan 1, 2 and 3 patents, will be satisfactory.

The invention has been described in detail herein with particular reference to preferred embodiments thereof. However, it will be understood that variations and modifications can be effected within the spirit and scope of the invention as described hereinabove and as defined in the appended claims.

What is claimed is:

1. In an improved apparatus for counting the quantity of a plurality of similar sheet-like objects stacked adjacent one another substantially coplanar on one edge thereof comprising a sensor array comprising sensor means whose effective width is very narrow relative to the thickness of each one of said stacked objects, illumination means, imaging means defining an optical axis and having a solid angle of acceptance $2\alpha$, and beam splitter means; means for effecting substantially constant scanning velocity movement of said sensor array traversing said coplanar edges of said stacked objects in a plane substantially parallel to the plane of said coplanar edges to thereby generate output signals from said sensor array containing object edge surface brightness information including information indicative of said quantity, signal generating means connected at its input to said sensor array output signals for generating sensor array output signals, rectifying means connected to the output of said signal generating means at its input for producing a rectified counting signal, and signal processing and counting means responsive to said rectified counting signals to count the number of said edges of said similar stacked objects, the improvement comprising, said sensor array's said sensor means and said illumination means being effectively disposed coaxially about said optical axis, said optical axis being included in a plane that is substantially normal to said coplanar edges of said stacked objects and substantially parallel to each individual one of said stacked sheet-like objects, said optical axis being tilted away from a normal to said coplanar edges by an angle substantially $\frac{1}{4}$ of said solid angle of acceptance and less than $\frac{3}{4}$ of said solid angle as said sensor array traverses said coplanar edges.

2. In an improved apparatus for counting the quantity of a plurality of similar sheet-like objects stacked adjacent one another substantially coplanar on one edge thereof comprising a sensor array comprising sensor means whose effective width is very narrow relative to the thickness of each one of said stacked objects, illumination means, imaging means defining an optical axis and having a solid angle of acceptance $2\alpha$, and beam splitter means; means for effecting substantially constant scanning velocity movement of said sensor array traversing said coplanar edges of said stacked objects in a plane substantially parallel to the plane of said coplanar edges to thereby generate output signals from said sensor array containing object edge surface brightness information including information indicative of said quantity, signal generating means connected at its input to said sensor array output signals for generating sensor array output signals, and signal processing and counting means responsive to said output signals to count the number of said edges of said similar stacked objects, the improvement comprising, at least one illumination, imaging and sensing means comprising said sensor array, each of said sensor array's said sensor means and said illumination means being effectively disposed coaxially about said optical axis, said optical axis being included in a plane that is substantially normal to said coplanar edges of said stacked objects and substantially parallel to each individual one of said stacked sheet-like objects, said optical axis being tilted away from a normal to said coplanar edges by an angle substantially $\frac{1}{4}$ of said solid angle of acceptance and less than $\frac{3}{4}$ of said solid angle as said sensor array traverses said coplanar edges.

3. In an improved apparatus for counting the quantity of a plurality of similar sheet-like objects stacked adjacent one another substantially coplanar on one edge thereof comprising at least two sensor arrays each comprising sensor means whose effective width is very narrow relative to the thickness of each one of said stacked objects, illumination means, imaging means defining an optical axis and having a solid angle of acceptance $2\alpha$, and beam splitter means; means for effecting substantially constant scanning velocity movement of said sensor array traversing said coplanar edges of said stacked objects in a plane substantially parallel to the plane of said coplanar edges to thereby generate output signals from said sensor array containing object edge surface brightness information including information indicative of said quantity, composite signal generating means connected at its input to said sensor array output signals for generating a composite sensor array output signal that is the equivalent of the differential sum of two sensor means sequentially traversing the edges of said stacked objects, rectifying means connected at its input to the output said composite signal generating means for producing a rectified composite counting signal, and signal processing and counting means responsive to said rectified composite output signals to count the number of said edges of said similar stacked objects, the improvement comprising, each of said sensor array's said sensor means and said illumination means being effectively disposed coaxially about said optical axis of said imaging means, the optical axis of each of said sensor array's being included in a plane that is substantially normal to said coplanar edges of said stacked objects and substantially parallel to each individual one of said stacked sheet-like objects and inclined at an angle $\phi$ on opposite sides of and measured from a normal to said coplanar edges, each of said angles $\phi$ being maintained at substantially $\frac{1}{4}$ said solid angle of acceptance and less than $\frac{3}{4}$ of said solid angle as said sensor array traverses said coplanar edges.

* * * * *